(12) United States Patent
Chheda et al.

(10) Patent No.: US 7,685,443 B2
(45) Date of Patent: Mar. 23, 2010

(54) SERVER CARD POWER SWITCH

(75) Inventors: Sachin Navin Chheda, Roseville, CA (US); Ricardo E. Espinoza-Ibarra, Carmichael, CA (US); Robert William Dobbs, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 647 days.

(21) Appl. No.: 10/684,768

(22) Filed: Oct. 14, 2003

(65) Prior Publication Data

US 2005/0081074 A1 Apr. 14, 2005

(51) Int. Cl.
G06F 1/26 (2006.01)
(52) U.S. Cl. ..................................... 713/320
(58) Field of Classification Search .................. None
See application file for complete search history.

(56) References Cited

U.S. PATENT DOCUMENTS

| | | | | |
|---|---|---|---|---|
| 5,572,141 | A * | 11/1996 | Hutton ........................ | 324/757 |
| 6,226,699 | B1 * | 5/2001 | Humpherys et al. ......... | 710/100 |
| 6,262,493 | B1 * | 7/2001 | Garnett ........................ | 307/64 |
| 6,613,984 | B1 * | 9/2003 | Hensley ................... | 174/138 G |
| 6,678,162 | B2 * | 1/2004 | Chewning ................... | 361/726 |
| 6,789,206 | B1 * | 9/2004 | Wierzbicki et al. ......... | 116/279 |
| 6,822,348 | B2 * | 11/2004 | Yen et al. .................... | 307/115 |
| 6,928,504 | B2 * | 8/2005 | Peacock ....................... | 361/786 |
| 6,967,283 | B2 * | 11/2005 | Rasmussen et al. ......... | 361/600 |
| 2003/0030978 | A1 | 2/2003 | Garnett et al. | |
| 2003/0105904 | A1 | 6/2003 | Abbondanzio et al. | |
| 2003/0112582 | A1 | 6/2003 | Sanders et al. | |
| 2003/0140267 | A1 | 7/2003 | Abbondanzio et al. | |
| 2004/0103345 | A1* | 5/2004 | Dunstan ...................... | 714/24 |

OTHER PUBLICATIONS

Newton, Harry, Newton's Telecom Dictionary, Mar. 2004, CMP Books, 20th edition, pp. 116.*
Samaras, Bill, "The Itanium Processor Cartridge", 2000 Intel Corporation, pp. 1-29, (2000).
ADLINK Technology Inc., "ADLINK Products Lines and Software", ADLINK:Product, pp. 5, (2002).< www.adlinktech.com >.
Zeichick, Alan, "Blades Almost As Cool As Ketchup", Linux Magazine, pp. 1-2. (Feb. 2003), < www.linux-mag.com >.
PCT Industrial Computer Manufacturer's Groups, "Compact PCI", pp. 1-3, (2003), < www.picmg.org >.
PCT Industrial Computer Manufacturer's Group, "CompactPCI Frequently Asked Questions", PICMG, pp. 1-5, (2003), < www.picmg.org >.

* cited by examiner

*Primary Examiner*—Thomas Lee
*Assistant Examiner*—Mohammed H Rehman

(57) ABSTRACT

One aspect of the present invention provides a server card that is removably insertable into a server chassis. An electronic power switching mechanism is disposed on the server card and is configured to cause three power states of the server card including a fully operational state, a standby state, and a fully shutdown state. In the fully operational state, a system power of the server card is enabled and a standby power of the server card is enabled. In the standby state, a system power of the server card is disabled and the standby power of the server card is enabled. In a shutdown state, the system power of the server card is disabled and the standby power of the server card is disabled.

10 Claims, 7 Drawing Sheets

SERVER CARD POWER SWITCH

BACKGROUND

Ever since their inception, there has been an on-going drive to make computers, and their components, faster and smaller. In recent computing history, this evolution has included a migration from stand-alone network servers to rack network servers. Rack servers allow for several independent or interdependent servers to be housed within a single frame as a vertical stack. The frame, or rack, typically includes some common functions for all of the servers within the frame. Accordingly, the rack arrangement creates both space and cost savings.

The next generation of high density computing introduced blade servers. In the blade server design, a chassis about the size of a single rack server holds a number of blade servers that are slidably inserted into the chassis. Each blade server is a card that carries basic server components such as central processing unit and memory. The chassis includes components common to all servers, such as power, cooling units, input/output circuitry, so that each blade server need not carry these bulkier components. With blade servers, a single blade chassis can carry as much computing power as would have been taken up by a six foot high set of rack servers.

Moreover, blade servers and the blade chassis are arranged to permit hot swapping (i.e., insertion and removal) of the blade servers into and from the blade chassis, thereby enhancing the flexibility and portability of computing with blade servers. However, this hot-swapping capability in conventional blade servers requires specialized operating system drivers, hot-swap controllers, and/or other circuitry and drivers for carrying the hot-swapping capability. Moreover, these components occupy space on the board, which is always at a premium, and complicate the compatibility of each blade server with the blade chassis. These issues frustrate the instant use that blade servers were intended to provide.

For these and other reasons, conventional blade servers and their chassis still face challenges in implementing a hot-swapping capability.

SUMMARY

One aspect of the present invention provides a server card that is removably insertable into a server chassis. An electronic power switching mechanism is disposed on the server card and is configured to cause three power states of the server card including a fully operational state, a standby state, and a fully shutdown state. In the fully operational state, a system power of the server card is enabled and a standby power of the server card is enabled. In the standby state, a system power of the server card is disabled and the standby power of the server card is enabled. In a shutdown state, the system power of the server card is disabled and the standby power of the server card is disabled.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims. Finally, although a flow chart in the figures of this application show a specific order of execution, the order of execution may differ from that which is depicted. All such variations are within the scope of the present invention.

Figure 1:
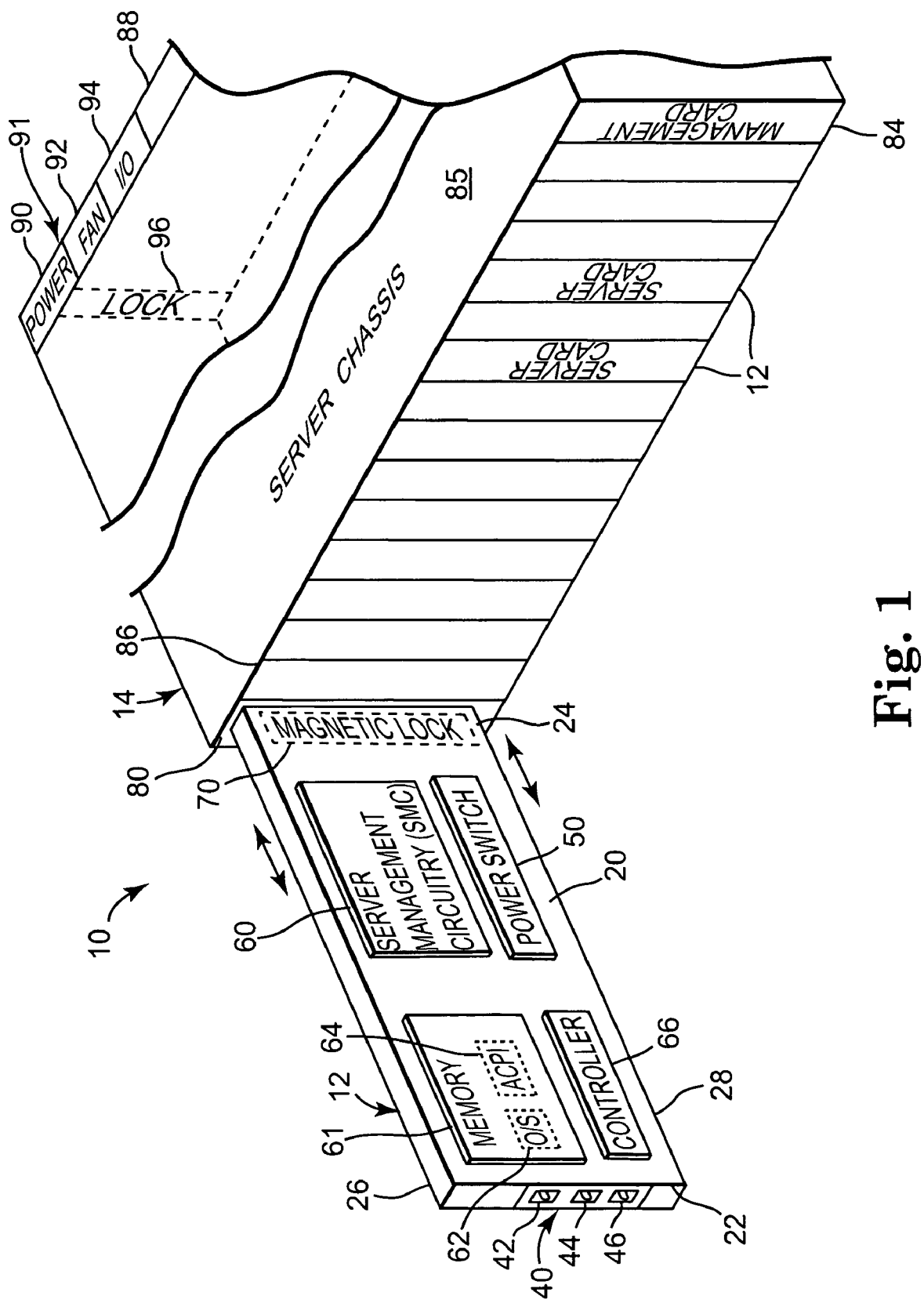
FIG. 1 is an isometric view of a server card system, according to an embodiment of the present invention.

One exemplary embodiment of the present invention is shown generally in FIG. 1 as system 10. System 10 comprises server card(s) 12 and server chassis 14. Server card 12 comprises a blade server or brick server, or other high density server module residing on a circuit card that is removably insertable into a slot within a server chassis and that has server computing components (e.g. CPU, memory, network connections) separate from elements on the server chassis 14 that are shared with multiple server cards 12 (e.g. power supply, cooling units). Server card 12 and server chassis 14 are configured according to one of a number of interface specifications, including but not limited to, the Compact Peripheral Component Interface (herein Compact PCI) standard, to enable server chassis 14 to act as backplane 91 (or bus) to each server card 12. Each server card 12 comprises printed circuit board 20 having first outer end 22, second insertable end 24, top edge 26, and bottom edge 28.

Each server card 12 also comprises physical power switch 40 having one or more physical buttons and/or switches for implementing electronic power state switch 50. Electronic power state switch 50, via physical power switch 40, enables hot-swapping (i.e., removal and insertion) of server cards 12 relative to server chassis 14 by controlling various power states of server card 12 to ensure that server card 12 is removed and/or inserted at appropriate times relative to its power state.

Physical power switch 40 optionally physically incorporates electronic state switch 50 and/or is in electrical communication with electronic power state switch 50. In this example, electronic power state switch 50 is a tri-state electronic switch (coupled to physical power switch 40 includes three physical buttons 42, 44, and 46) for directing power management between three power states of server card 12. However, as will be described in association with FIGS. 4-6, physical power switch 40 and electronic power state switch 50 optionally comprise other electronic and physical switch configurations such as two-button switches, push button locks, latch switches, which are optionally used in various combinations to implement different power states of server card 12.

Server card 12 also comprises, but is not limited to, server management circuitry (SMC) 60, operating system (OS) 62, memory 61, and controller 66. Memory 61 stores operating system 62 and optionally stores an Advanced Configuration and Power Interface (ACPI) module 64 as well as general data and/or one or more application programs adapted to a purpose of server card 12, such as network communications, telephone switching, etc. Operating system 62 optionally is partially stored in a memory location external to memory 62, such as a CD-ROM or disk. In addition, firmware memory that is external to memory 62 is also optionally employed for storing Advanced Configuration and Power Interface modules 64 for use with operating system 62.

Server management circuitry 60 of server card 12 acts to manage various functions of server card 12 including, but not limited to, coordinating power states of server card 12 with operating system 62. Controller 66 (e.g central processing unit, CPU) of server card 12 cooperates with server management circuitry 60 and optionally is incorporated into server management circuitry 60. Controller 66 preferably includes hardware, software, firmware or combination of these. In one preferred embodiment, controller 66 includes a microprocessor-based system or other system capable of performing a sequence of logical operation and including memory for storing information. Alternatively, controller 66 is incorporated into an application specific integrated circuit (ASIC), which includes hardware, software, and/or firmware.

Server card 12 also comprises optional magnetic lock 70, which is used for selectively physically locking server card 12 relative to chassis 14 to prevent untimely removal of server card 12.

Server chassis 14 comprises frame 85 having front end 86, back end 88, as well as backplane 91 or bus including components such as power supply 90, cooling unit 92, and input/output module 94. Power supply 90 provides power to all of server cards 12 removably installed within server chassis 14, as well as to management server card 84. Likewise, cooling unit 92 provides forced air ventilation to server cards 12 within server chassis 14. Server chassis 14 also comprises optional magnetic lock 96 for cooperating with magnetic lock 70 of server card 12 to physically lock server card 12 relative to server chassis 14.

Management server card 84 is a special instance of server cards 12 that is configured to manage functions and operations of server chassis 14 for supporting a plurality of server cards 12 (e.g., application servers) within server chassis 14.

As shown in FIG. 1, second end 24 of server card 12 is inserted into front end 86 of server chassis 14 into any one of slots 80 of server chassis 14, and advanced until housed within server chassis 14. In this fully inserted position, second insertable end 24 is mechanically and electrically coupled to backplane 91 of server chassis 14. When magnetic lock 96 of server chassis 14 is employed and/or optional magnetic lock 70 of server card 12 is employed, server card 12 is physically locked to server chassis 14. Other mechanical and/or electrically activated securing mechanisms beside magnetic lock 70 can be used to physically secure server card 12 to server chassis 14.

Figure 2:
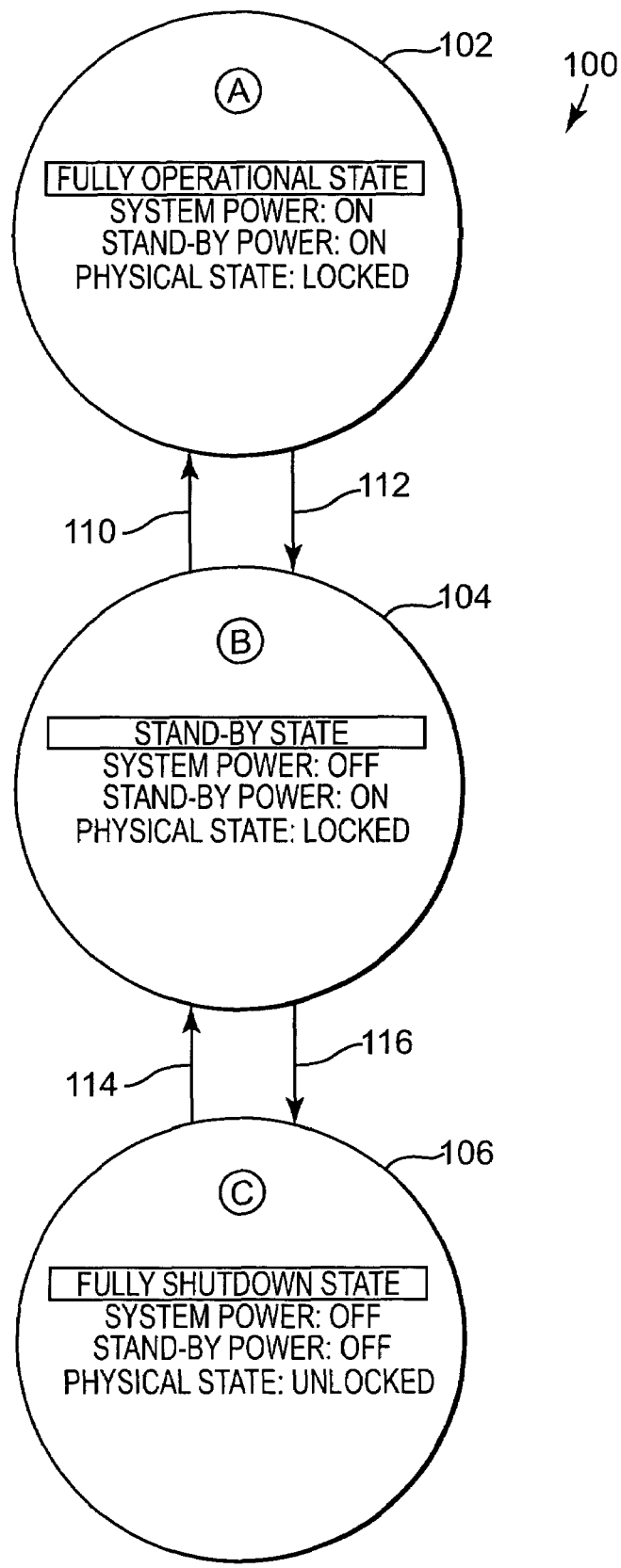
FIG. 2 is flow diagram of power management states of a server card, according to an embodiment of the present invention.

FIG. 2 illustrates power state scheme 100 of server card 12 which comprises fully operational state A (shown in circle 102), stand-by state B (shown in circle 104), and fully shutdown state C (shown in circle 106). These three distinct power states of server card 12 are provided via electronic power state switch 50 to ensure that within a hot-swapping environment, server cards 12 are not removed at inappropriate times (e.g. when system power is enabled). Specific circuitry on server card 12 for implementing power state management with electronic power state switch 50 is described in more detail in association with FIG. 3.

Each power state of server card 12 includes a system power state, a standby power state, and a physical locking state. As shown in circle 102 of FIG. 2, in a fully operational state A of server card 12, system power of server card 12 is enabled and standby power of server card 12 is enabled. In this fully operational state A, server card 12 is in a physically locked state so that server card 12 cannot be physically removed from server chassis 14, thereby preventing inadvertent or intentional removal of server card 12 from server chassis 14 when system power of server card 12 is enabled.

As shown in circle 104 of FIG. 2, in standby state B of server card 12, system power of server card 12 is disabled and standby power is enabled. In this standby state B, server card 12 cannot be physically removed from server chassis 14, thereby preventing hot-swapping removal of server card 12 from server chassis 14 when standby power of server card 12 is enabled.

As shown in circle 106 of FIG. 2, in fully shutdown state C of server card 12, both system power and standby power of server card 12 are disabled, and server card 12 is an unlocked state so that server card 12 can be removed from server chassis 14. With neither system power nor standby power enabled in this fully shutdown state, server card 12 is electrically inactive and can be safely removed from server chassis 14.

In addition, with server card 12 in fully shutdown state C, server card 12 also optionally can remain physically locked to chassis 14 to prevent unauthorized removal of server card 12 from chassis 14. In this aspect, management server card 84 uses magnetic lock 96 of chassis 14, which reciprocates with magnetic lock 70 of server card 12 to physically lock server card 12 while server card 12 is in the fully shutdown state C.

As also shown in FIG. 2, pathway 110 identifies a transition from standby state B to fully operational state A, while pathway 112 identifies a transition from fully operational state A to standby state B. Likewise, pathway 116 identifies a transition from standby state B to fully shutdown state C, and pathway 114 identifies a transition from fully shutdown state C to standby state B.

Figure 3:
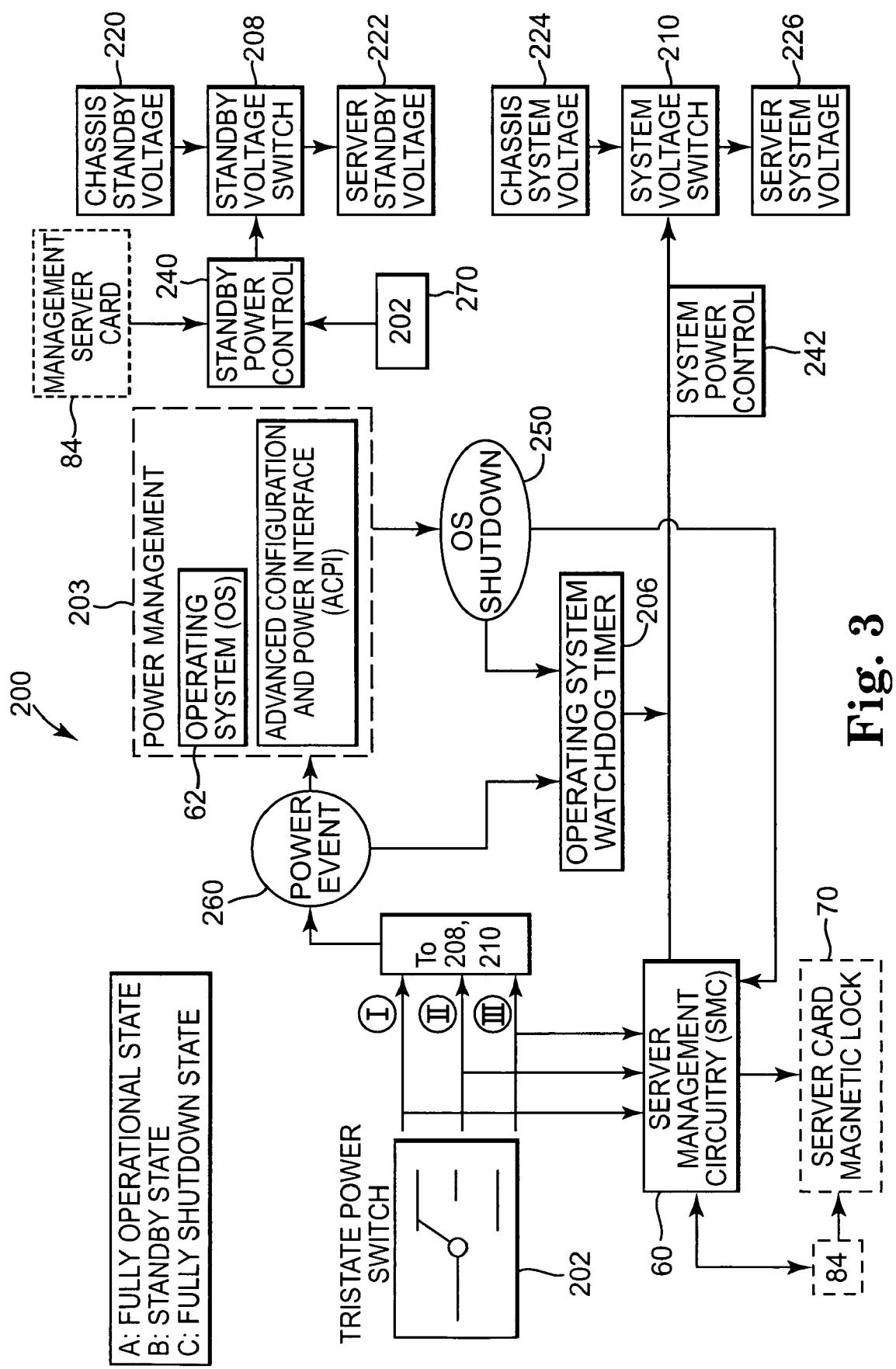
FIG. 3 is a block diagram schematically illustrating a switch mechanism of a server card, according to an embodiment of the present invention.

FIG. 3 illustrates power switching system 200 of server card 12 for managing power states A, B, C of server card 12 (FIG. 2) during insertion and removal of server card 12 relative to server chassis 14. System 200 comprises electronic power switch 50 embodied as tristate power switch 202, optional magnetic lock 70, power management module 203 including operating system 62, as well as comprising operating system watchdog timer 206, standby voltage switch 208, and system voltage switch 210. As further shown in FIG. 3, power switching system 200 comprises chassis standby voltage 220, server standby voltage 222, chassis system voltage 224, server system voltage 226, standby power control 240, system power control 242. Finally, power switching system 200 also comprises events such as power event 260 and operating system (OS) shutdown 250.

FIG. 3 also illustrates management server card 84 (FIG. 1) in connection with its operation with standby power control 240 and optional operation with magnetic lock 70, or magnetic lock 96 (FIG. 1).

Power management module 203 controls power events for server card 12, such as enabling and disabling of system power to server card 12. Power management module 203 comprises operating system 62 and optionally operates according to the Advanced Configuration Power Interface (ACPI) specification (represented by module 64), which cooperates to ensure proper software and hardware coordination during power state changes.

Operating system (OS) watchdog timer 206 comprises a portion of server management circuitry 60 or a separate circuitry component that monitors transition 112 (FIG. 2) from fully operational state A to standby state B of server card 12 in which system power becomes disabled. OS watchdog timer 206 is configured with a programmable timeout for triggering a system power shutdown in the event that operating system 62 fails to properly shutdown. Operating system shutdown 250 represents operating system 62 shutting down as part of transition from fully operational state A to standby state B of server card 12 or as part of another power event, as well as part of other events and functions inherent in operating system 62.

Chassis standby voltage 220 of system 200 comprises a standby voltage supplied via power supply 90 of server chassis 14 and is made available to each server card 12 for maintaining communication with server chassis 14 and basic functions of server card 12 via server management circuitry 60. Standby voltage switch 208 controls passing of chassis standby voltage 220 to enable server standby voltage 222, while standby power control 240 comprises an element of server card 12 for controlling standby voltage switch 208. As shown in FIG. 3, box 270 represents a direct connection from tristate power switch 202 to standby power control 240 and management server card 84 is also shown coupled to and in communication with standby power control 240 for controlling standby power control 240.

Chassis system voltage 224 of system 200 comprises a system voltage supplied via power supply 90 of server chassis 14 and is made available (via backplane 91 of server chassis 14) to each server card 12 via backplane 91 of server chassis 14. System voltage switch 210 controls passing of chassis system voltage 224 to enable server system voltage 226, while system power control 242 comprises an element of server card 12 for controlling system voltage switch 210.

Optional magnetic lock 70 of server card 12 is controlled via server management circuitry 60 to permit selective physical locking of server card 12 relative to server chassis 14 when server card 12 is in fully operational state A and in standby state B. When server card 12 is in fully shutdown state C, management server card 84 (FIG. 1) optionally controls magnetic lock 96 to physically lock and unlock server card 12 relative to chassis 14 as desired.

Tristate power switch 202 is in electrical communication with both system power and standby power via server management circuitry 60 (and optionally management server card 84) to provide for three distinct power states of power switching system 200.

In fully operational state A of server card 12, tristate power switch 202 is in position I and directly, or via server management circuitry 60, signals system voltage switch 210 to be closed. In addition, tristate power switch 202 directly (box 270) or via management server card 84 signals standby voltage switch 208 to be closed. This fully operational state A is shown in circle 102 of FIG. 2. Via server management circuitry 60, optional magnetic lock 70 is enabled to physically lock server card 12 in server chassis 14.

In standby state B of server card 12, tristate power switch 202 is in position B and directly (box 270 or indirectly via management server card 84), signals standby voltage switch 208 to be closed, thereby enabling server standby voltage 222. Tristate power switch 202 also directly or via server management circuitry 60, signals system voltage switch 210 to be open, thereby causing server system voltage 226 to be disabled. Accordingly, server card 12 remains powered by server chassis 14 for operating server management circuitry 60, but is not powered for operation as a server. This standby state B is shown in circle 104 of FIG. 2. Via server management circuitry 60, optional magnetic lock 70 is enabled to physically lock server card 12 in server chassis 14.

In fully shutdown state C of server card 12, tristate power switch 202 is in position C and directly (box 270) or via management server card 84, signals standby voltage switch 208 to be open, thereby causing server standby voltage 222 to be disabled. In addition, tristate power switch 202 directly or via server management circuitry 60, signals system voltage switch 210 to be open, thereby causing server system voltage 226 to be disabled, as shown in FIG. 3. This function completely disables server card 12 from functioning in server chassis 14 and permits safe removal of server card 12 from server chassis 14. Via server management circuitry 60, optional magnetic lock 70 is disabled, allowing server card 12 to be inserted or removed relative to server chassis 14 in this power state.

As previously described, in fully shutdown state C, server card 12 can optionally be physically locked to chassis 14 via management server card 84 and magnetic lock 96 of chassis 14.

When tristate power switch 202 is moved from fully operational state A to standby state B, tristate power switch 202 signals operating system 62 to completely shutdown. Power management module 203 receives this signal as a power event 260, thus triggering a system power shutdown (per a power interface specification such as the Advanced Configuration and Power Interface (ACPI) specification) in cooperation with operating system 62. Once operating system shutdown 250 occurs, server management circuitry 60 receives a signal to complete system power shutdown via system power control 242 to open system voltage switch 210 and thereby disable server system voltage 226.

However, at the same time that tristate power switch 202 signals operating system 62 to shutdown via power event 260, tristate power switch 202 signals operating system watchdog timer 206 of power event 260. If operating system 62 has not shutdown within a programmed timeout of OS watchdog timer 206 because operating system is hung, then OS watchdog timer 206 initiates, via system power control 242, a shutdown of system power by opening system voltage switch 210. OS watchdog timer 206 is triggered upon operating system 62 becoming hung before, during, or after the transition from fully operational state 102 to standby state 104.

When tristate power switch 202 is moved from fully shutdown state C to standby state B, power switch 50 signals standby voltage switch 208 to close, thereby enabling server standby voltage 208, which in turn enables operation of server management circuitry 60.

Finally, server card 12 comprises an optional electronic user interface configured for communication with power switch 202 to cause switching between the three power states of server card 12.

Electronic power state switch 50 of server card 12 (FIG. 1) is embodied in power switching system 200 as shown in FIG.

Figure 4:
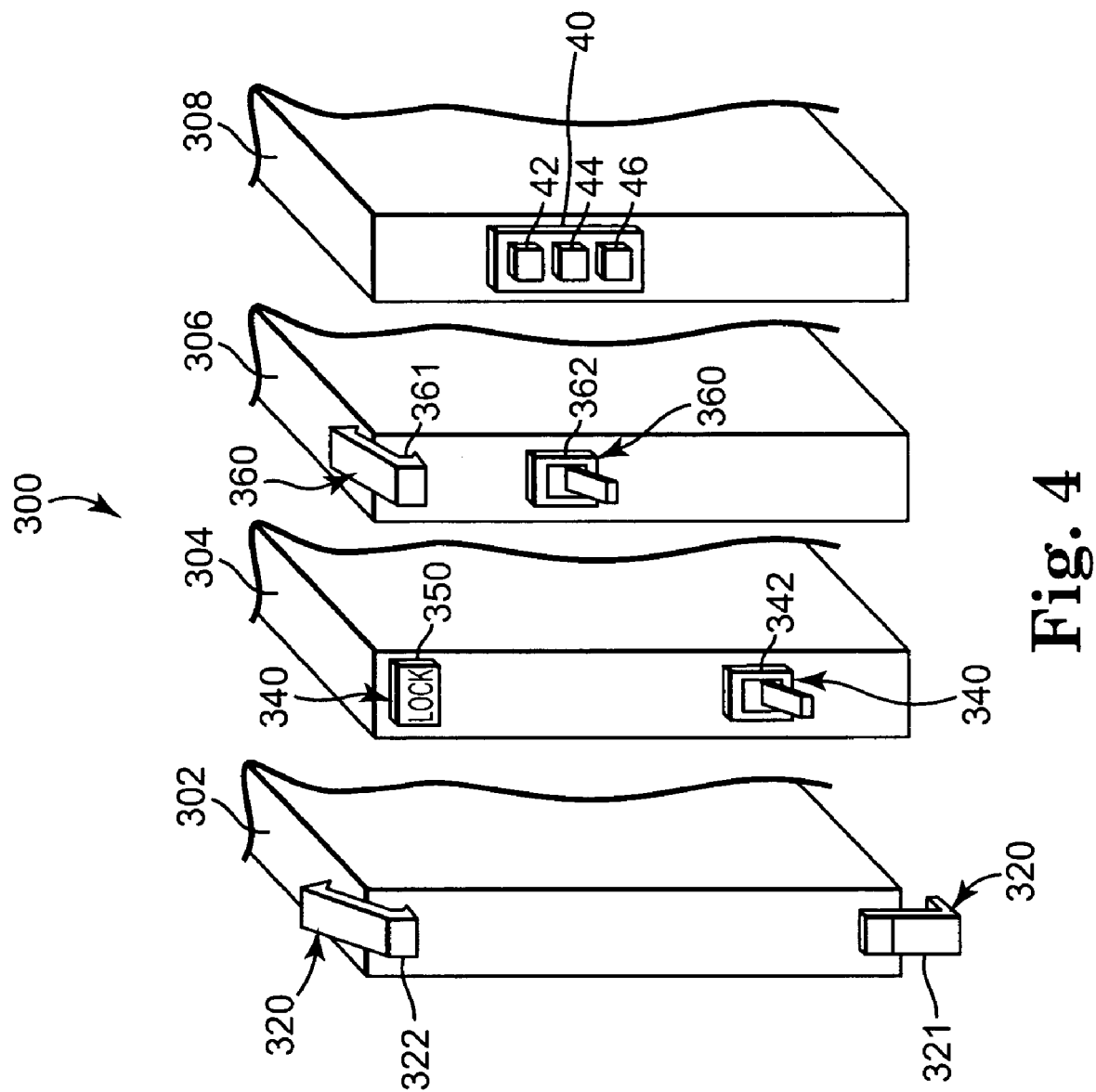
FIG. 4 is an isometric view of a plurality of switching mechanisms, according to an embodiment of the present invention.

3 as a tristate power switch 202. However, alternative switches to tristate power switch 50 can be used, such as various combinations of electronic two-state switches, latch switches, push button locks, etc. For example, FIG. 4 illustrates a physical representation of several alternative power state switches. For illustrative purposes four different blade servers are shown, each having a different type of switching mechanism. The physical and electronic aspects of these alternative power switching mechanisms are described and illustrated in association with FIG. 5.

FIG. 4 shows first server card 302, second server card 304, third server card 306, and fourth server card 308. Each of server cards 302-308 have substantially the same features and attributes of server card 12, except for each one having an alternate electronic power switching mechanism for managing power states of the respective server cards 302-308.

Figure 5:
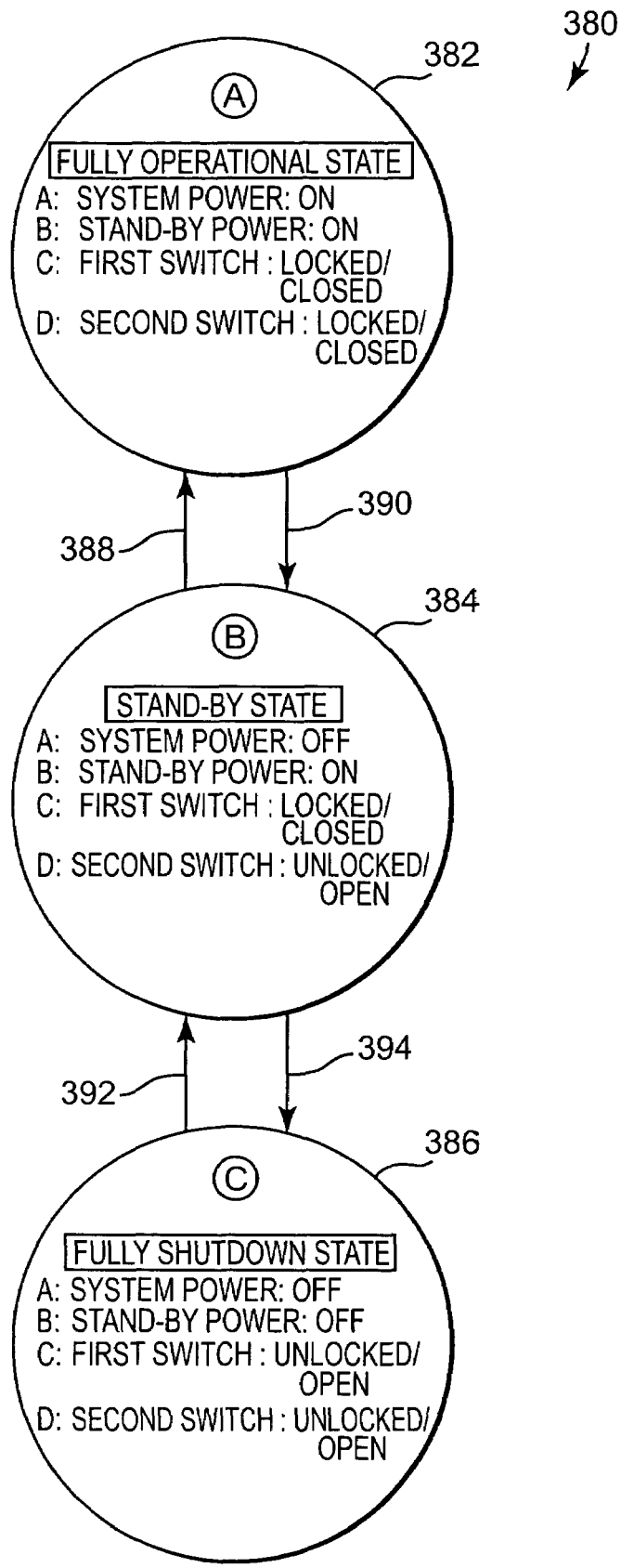
FIG. 5 is a flow diagram of power management states of an alternative server card, according to an embodiment of the present invention.

First server card 302 comprises electronic switching mechanism 320 including first latch switch 321 and second latch switch 322. Some conventional blade servers include a pair of mechanical latches at the bottom and top of the front edge of the blade server for mechanically securing the blade server within a slot of the blade chassis. In this aspect of the present invention, such mechanical latches are modified to include an electronic switch for managing power states of server card 12. In particular, first latch switch 321 and second latch switch 322 each comprise a two-state switch. When these latch switches 321, 322 are mechanically closed, a corresponding electronic switch enables power (e.g. system and/or standby). Conversely, when latch switches 320, 322 are mechanically open to permit insertion/removal, then corresponding electronic switches (e.g. system and/or standby) are open to disable power. The electronic switch is optionally embodied within the physical switch. As shown in FIG. 4, second latch switch 322 is shown in a latched position and first latch switch 321 is in an unlatched position as an example of how those latches function. The electronic and mechanical functions associated with those unlatched and latched position of each latch switch 321, 322 are described and illustrated in association with FIGS. 5-6. In particular, a power state model of first server card 302 is shown in FIG. 5 and power switching system 400 embodying electronic switching mechanism 320 of first server card 302 is described and illustrated in FIG. 6.

As shown in FIG. 4, second server card 304 comprises electronic switching mechanism 340 including two-state switch 342 and unlock button 350. In this arrangement, lock button 350 provides mechanically locking of server card 304 relative to a chassis (e.g. server chassis 14 in FIG. 1). Lock button 350 optionally triggers magnetic lock 70 (FIGS. 1 and 3) as the mechanically locking mechanism. When two-state switch 342 is closed, the system is either in fully operational state or standby state. When two-state switch 342 is open, the system is fully shutdown. When the two-state switch 342 is closed and unlock button is enabled (e.g. locked), server is in fully operational state. When two-state switch 342 is open and unlock pushbutton is enabled (e.g. locked), server card is in standby state. Switching mechanism 342 is described and illustrated in association with FIG. 6. A power state model representing operation of electronic switching mechanism 340 is described and illustrated in association with FIG. 7.

Also shown in FIG. 4, third server card 306 comprises an electronic switching mechanism 360, including first physical latch 361 and two-state switch 362. In this arrangement, first latch 361 provides mechanical locking of server card 306 relative to server chassis 14. Like second server card 304, a power state model of third server card 306, that is based on the operation of switching mechanism 360, is described and illustrated in FIG. 7.

Fourth server card 308 shown in FIG. 4 comprises tristate power switch 40, corresponding to electronic tristate switch 50, 202, as previously described and illustrated in association with FIGS. 1-3.

As shown in FIG. 5, power state model 380 of first server card 302 (FIG. 4) comprises a first fully operational state A (circle 382), a second stand-by state B (circle 384), and a third fully shutdown state C (circle 386).

In fully operational state A (circle 382), system power of first server card 302 is enabled and standby power of first server card 302 is enabled. This corresponds to a closed position of both first and second latch switches 321, 322 corresponding to top and bottom switches, respectively. The closed position of latch switches both physically locks first server card 302 in a physically locked state relative to server chassis 14 and electronically enables both system and standby power, with one of the latch switches 321, 322 enabling system power and the other latch switch 321, 322 enabling standby power.

In standby state B (circle 384), the system power of first server card 302 is disabled and the standby power of first server card 302 is enabled. This state corresponds to an open position of first latch switch 321 and a closed position of second latch switch 322, as shown in the example of first server card 302 in FIG. 4. The open position of first latch switch 321 physically unlocks a portion of first server card 302 relative to server chassis 14 and while the closed position of second latch switch 322 physically locks first server card 302 relative to server chassis 14. Second latch switch 322, in its closed position, is sufficient to secure first server card 302 relative to server chassis 14. In addition, the open position of first latch switch 321 electronically disables system power while the closed position of second latch switch 322 enables standby power.

In a fully shutdown state C (circle 386), both system power and standby power of first server card 302 are disabled. This state corresponds to an open position of first latch switch 321 and an open position of second latch switch 322. The open position of first latch switch 321 electronically disables system power while the open position of second latch switch 322 disables standby power so that all power from server chassis 14 to first server card 302 is completely shutdown. Moreover, with a complete power shutdown, removal of first server card 302 from server chassis 14 is safe. Accordingly, the open position of first latch switch 321 and of second latch switch 322 completely physically unlocks first server card 302 relative to server chassis 14, permitting its removal.

In addition, FIG. 5 illustrates transition pathway 388 from standby state B to fully operational state A and transition pathway 390 from fully operational state A to standby state B. Likewise, transition pathway 394 from standby state B to fully shutdown state C, and transition pathway 392 from fully shutdown state C to standby state B. Transition pathway 390 corresponds to a power event 414 that is described and illustrated in association with FIG. 6.

Figure 6:
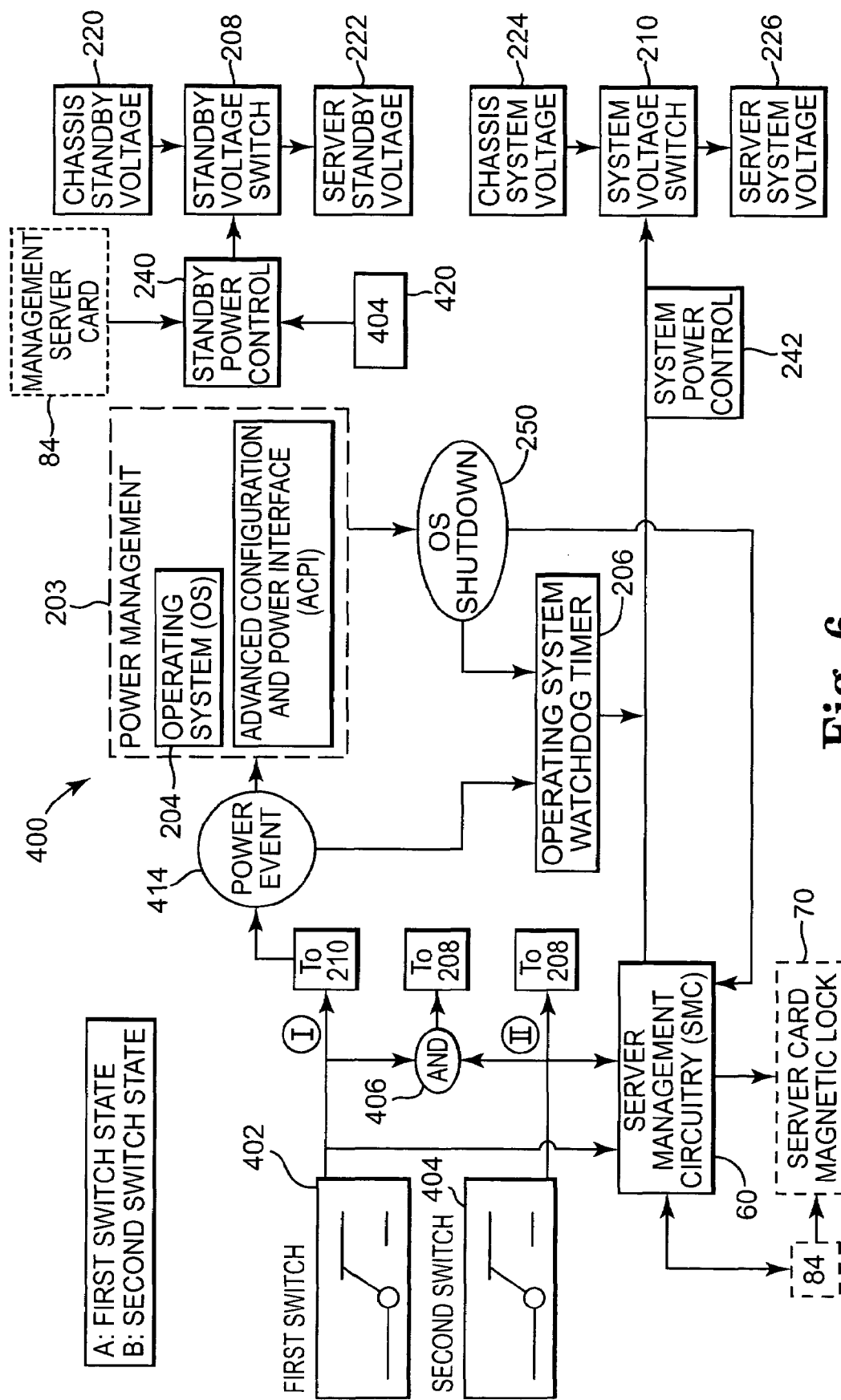
FIG. 6 is a block diagram schematically illustrating a switching mechanism of a server card, according to an embodiment of the present invention.

FIG. 6 illustrates power switching system 400 for managing power states of server card 12 during insertion and removal of server card 12 relative to server chassis 14. System 400 comprises electronic power switch 50 (FIG. 1) embodied as first switch 402 and second switch 404 with AND operator function 406. System 400 also comprises first switch state I, second switch state II, power button event 414, and box 420. In all other respects, system 400 carries substantially the same features and attributes of system 200, with like elements having like reference numerals. In particular, system 400 comprises, optional magnetic lock 70, power management module 203 including operating system 62 (with Advanced Configuration Power Interface (ACPI) specification), as well as operating system watchdog timer 206, standby voltage switch 208, and system voltage switch 210. As further shown in FIG. 3, power switching system 400 comprises chassis standby voltage 220, server standby voltage 222, chassis system voltage 224, server system voltage 226, standby power control 240, system power control 242. Finally, power switching system 400 also comprises events such as power event 414 and operating system (OS) shutdown 250.

FIG. 6 also illustrates management server card 84 (FIG. 1) in connection with its operation with standby power control 240 and optional operation with magnetic lock 70, or magnetic lock 96 (FIG. 1).

As shown in FIG. 6, first electronic switch 402 and second electronic switch 404 are in electrical communication with both system power and standby power in system 400 to provide for three distinct power states of a server card (e.g. server card 302). These three power states (A, B, C) were previously described and illustrated in association with power state model of FIG. 5 and first card server 302 of FIG. 4. In this example, first switch 402 in FIG. 6 corresponds to first switch in FIG. 5 (first latch switch 321 in FIG. 4) and second switch 404 in FIG. 6 corresponds to second switch in FIG. 5 (second latch switch 322 in FIG. 4).

As also shown in FIG. 6, box 420 represents a direct connection from two-state power switch 404 to standby power control 240 and management server card 84 is also shown coupled to and in communication with standby power control 240 for controlling standby power control 240.

In fully operational state A (FIG. 5) of first server card 302, via server management circuitry 60, a closed first switch 402 signals system voltage switch 210 to be closed, thereby causing system power to be enabled (server system voltage 226 is on). In addition, via direct connection (box 420) or via management server card 84, a closed second switch 404 signals standby voltage switch 208 to close, thereby causing standby power to be enabled (server standby voltage 222 is on). This fully operational state A is shown in circle 382 of FIG. 5. As closed first switch 402 corresponds to a physically locked first latch switch 321 and as closed second switch 404 corresponds to a physically locked second latch switch 322, these closed first and second switches 402, 404 physical lock first server card 302 relative to server chassis 14.

In standby state B (FIG. 5) of first server card 302, via server management circuitry 60, an open first switch 402 signals system voltage switch 210 to be open, thereby causing system power to be disabled (server system voltage 226 is off). In addition, via direction connection (box 420) or via management server card 84, a closed second switch 404 signals standby voltage switch 208 to close, thereby causing standby power to be enabled (server standby voltage 222 is on). This standby state B is shown in circle 384 of FIG. 5. Although an open first switch 402 corresponds to a physically unlocked first latch switch 321 and a closed second switch 404, which corresponds to a physically locked second latch switch 322, is sufficient to physically lock first server card 302 relative to server chassis 14. Accordingly, in standby state B, first server card 302 remains powered by server chassis 14 for operating server management circuitry 60, but is not powered for operation as a server. This standby state B is shown in circle 384 of FIG. 5.

In fully shutdown state C of first server card 302, via server management circuitry 60, an open first switch 402 signals system voltage switch 210 to be open, thereby causing system power to be disabled (server system voltage 226 is off). In addition, via direction connection (box 420) or via management server card 84, an open second switch 404 signals standby voltage switch 208 to be open, thereby causing standby power to be disabled (server standby voltage 222 is off). This shutdown state C is shown in circle 386 of FIG. 5. Since an open first switch 402 corresponds to a physically unlocked first latch switch 321 and an open second switch 404 corresponds to a physically unlocked second latch switch 322, first server card 302 is physically unlocked relative to server chassis 14. Accordingly, in fully shutdown state C, first server card 302 has no power from chassis 14 and can be safely removed or inserted relative to chassis 14.

When first power switch 402 of power switching system 400 is opened to move first server card 302 from fully operational state A to standby state B, first power switch 402 signals operating system 62 to completely shutdown. In particular, power management module 203 receives this signal as a power event 414, thus triggering system power shutdown per Advanced Configuration and Power Interface specification module 64 in cooperation with operating system 62. Once operating system shutdown 250 occurs, server management circuitry 60 receives a signal to complete system power shutdown via system power control 242 to open system voltage switch 210 and thereby disable server system voltage 226.

However, at the same time that first power switch 402 signals operating system 62 to shutdown via power event 414, first power switch 402 signals operating system watchdog timer 206 of power event 260. If operating system 62 has not shutdown within a programmed timeout of OS watchdog timer 206 because operating system is hung, then OS watchdog timer 206 initiates via system power control 242 a shutdown of system power by opening system voltage switch 210. OS watchdog timer 206 is triggered upon operating system 62 becoming hung before, during, or after the transition 390 from fully operational state A to standby state B.

When second switch 404 is moved from fully shutdown state 386 to standby state 384, second switch 404 signals standby voltage switch 208 to close enabling server standby voltage 222, which in turns enables operation of server management circuitry 60.

Accordingly, power switching system 400 (e.g. a power switching mechanism) of a server card enables hot-swapping of one or more server cards in and out of server chassis by managing power states of each server card through a pair of two-state switches, optionally coupled to a physical lock (e.g. magnetic lock 70).

Figure 7:
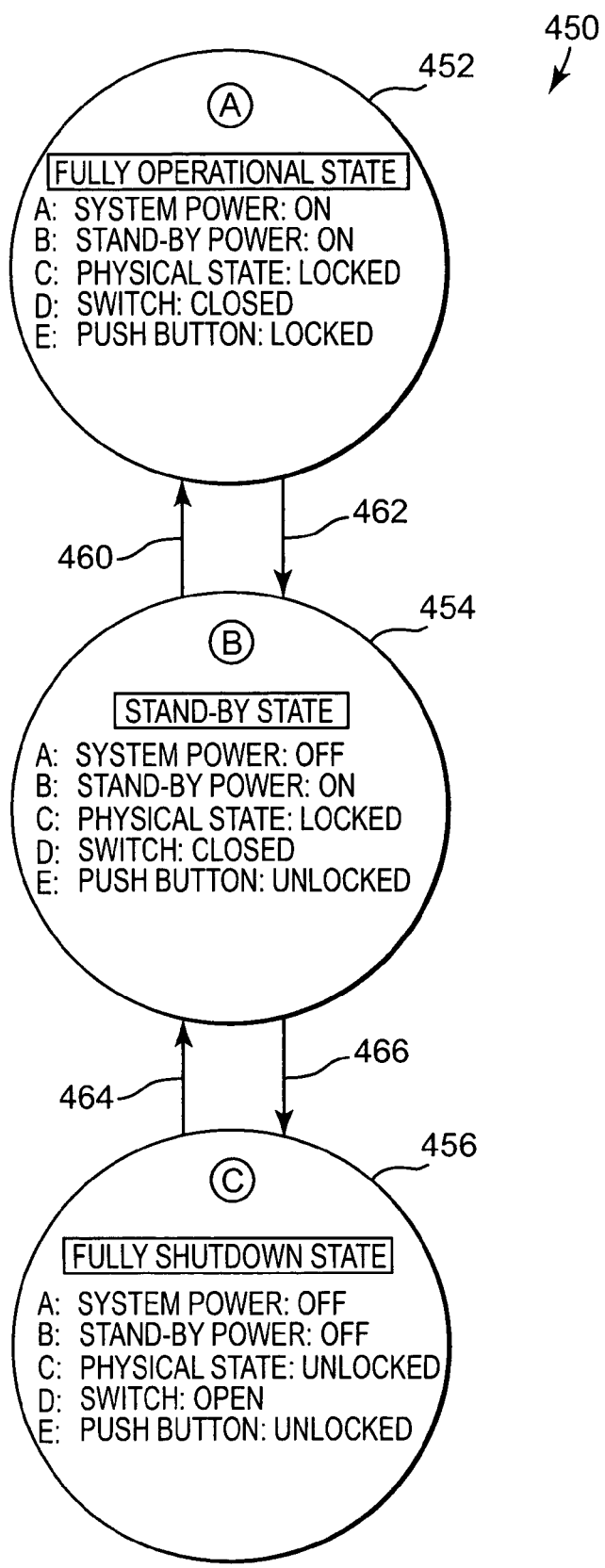
FIG. 7 is a flow diagram of power management states of an alternative server card, according to an embodiment of the present invention.

FIG. 7 illustrates power state model 450 for second server card 304 that is shown in FIG. 4, and which comprises electronic switching mechanism 340 embodied as two-state switch 342 and push button lock switch 350. Push button lock switch 350 is in communication with magnetic lock 70 (FIGS. 1, 3, 6) which is configured for physically locking third server card 304 relative to server chassis 14 upon activation of push button lock switch 350. Switching mechanism 340 can be embodied as first and second switches 402, 404 (shown in FIG. 6) with two-state switch 342 acting as first switch 402 and push button lock 350 acting as second switch 404.

Power state model 450, as shown in FIG. 7, comprises a fully operational state A (shown in circle 452), a stand-by state B (shown in circle 454), and a fully shutdown state C (shown in circle 456).

In fully operational state A (circle 452), two-state switch 342 is closed and push button lock 350 is engaged, thereby both enabling system power and standby power of second server card 304 and physically locking second server card 304 relative to server chassis 14. In standby state B (circle 454), two-state switch 342 is open and push button lock 350 is engaged, thereby disabling system power and enabling standby power of second server card 304, and maintaining second server card 304 in a physically locked state relative to server chassis 14. In a fully shutdown state (circle 456), two-state switch 342 is open and push button lock 350 is disengaged, thereby disabling both standby power and system power of second server card 304 and releasing second server card 304 from a physically locked state relative to server chassis 14.

As also shown in FIG. 7, pathway 460 identifies a transition from standby state B to fully operational state A, while pathway 462 identifies a transition from fully operational state A to standby state B. Likewise, pathway 466 identifies a transition from standby state B to fully shutdown state C, and pathway 464 identifies a transition from fully shutdown state C to standby state B.

In addition, FIG. 7 also identifies a power state model for third server card 306 that is substantially the same as the power state model for second server card 304. In particular, two-state switch 362 of electronic switching mechanism 360 of third server card 306 operates substantially the same as two-state switch 342 of second server card 304, and latch switch 361 of electronic switching mechanism 360 of third server card operates substantially the same as push button switch 350 of second server card 304 for physically locking and unlocking third server card 306 relative to chassis 14.

Embodiments of the present invention provides an elegant effective solution to managing power states of server cards (e.g. blade servers, brick servers, etc) that does not require the use of specialized drivers for operating system of server card 12, server chassis 14, nor does it require any specialized controllers dedicated to implementing a hot-swapping feature of server cards.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A power state manager for a server card comprising:
   means for electronically disabling and enabling a system power and a standby power of a server card to manage three power states of the server card; and
   means for physically securing the server card relative to the chassis in a first power state when the system power of the server card and the standby power of the server card are enabled and in a second power state when the standby power is enabled.

2. The power state manager of claim 1 wherein the means for electronically disabling and enabling comprises at least one of:
   an electronic tristate switch;
   a pair of two-state switches;
   a two-state switch and a push button lock; and
   a pair of latch switches; and wherein the means for enabling and disabling comprises:
   a watchdog timer configured to perform a shutdown of the system power in the event that an operating system of the server card fails to shutdown upon transition between the three different power states of the server card.

3. A server comprising:
   a server card that is removably insertable into a server chassis;
   a tristate electronic switch disposed on the server card and including:
      a first switch state to cause the server card to be in a fully operational state in which a system power of the server card is enabled and in which a standby power of the server card is enabled;
      a second switch state to cause the server card to be in a standby start in which the system power of the server card is disabled and the standby power of the server card is enabled; and
      a third switch state to cause the server card to be in a shutdown state in which the system power of the server card is disabled and the standby power of the server card is disabled.

4. A server comprising:
   a server card that is removably insertable into a server chassis;
   an electronic switching mechanism disposed on the server card and comprising a first electronic two-state switch and a second push button switch disposed on the at least one server card and together defining three power states of the server card including:
      a first fully operational start of the server card corresponding to the first electronic two-state switch being closed and the second push button switch being enabled, thereby enabling both a system power of the server card and a standby power of the server card, and the enabled second push button switch activating a locking mechanism to physically secure the server card relative to the chassis;
      a second standby state of the server card corresponding to the first electronic two-state switch being open and the second push button being enabled, thereby disabling the system power of the server card and enabling the standby power of the server card, and the enabled second push button switch activating the locking mechanism to physically secure the server card relative to the chassis; and
      a third full shutdown start corresponding to the first electronic two-state switch being open and the second push button being disabled, thereby disabling both the system power of the server card and the standby power of the server card and deactivating the locking mechanism to physically release the server card relative to the chassis.

5. A server comprising:
   a server card that is removably insertable into a server chassis;
   an electronic switching mechanism disposed on the server card and comprising a first latch switch and a second latch switch with each respective latch switch configured for removably securing the server card to the chassis and configured for managing three power states of the server card including:
      a fully operational state corresponding to the first latch switch being in a closed position physically securing the server card relative to the chassis and electronically causing a system power of the server card to be enabled and corresponding to the second latch switch being in a closed position physically securing the server card relative to the chassis and electronically causing a standby power of the server card to be enabled;

a standby state corresponding to the first latch switch being in an open position physically releasing the server card relative to the chassis at the first latch switch and electronically causing the system power of the server card to be disabled, and corresponding to the second latch switch being in a closed position physically securing the server card relative to the chassis and electronically causing the standby power of the server card to be enabled; and a shutdown state corresponding to the first latch switch being in an open position physically releasing the server card relative to the chassis and electronically causing the system power of the server card to be disabled, and corresponding to the second latch switch being in an open position physically releasing the server card relative to the chassis and causing the standby power of the server card to be disabled, thereby permitting removal of the server card relative to the chassis.

6. A server comprising:

a server card that is removably insertable into a server chassis;

an electronic switching mechanism disposed on the server card and comprising a first electronic two-state switch and a second latch switch disposed on the at least one server card and together defining three power states of the server card including:

a first fully operational state of the server card corresponding to the first electronic switch being closed and the second latch switch being closed, thereby enabling both a system power of the server card and a standby power of the server card with the second latch switch physically securing the server card to the chassis;

a second standby state of the server card corresponding to the first electronic switch being open and the second latch switch being closed, thereby disabling the system power of the server card and enabling the standby power of the server card with the second latch switch physically securing the server card to the chassis; and a third full shutdown state corresponding to the first electronic switch being open and the second latch switch being open, thereby disabling both the system power of the server card and the standby power of the server card with the second latch switch permitting physical removal of the server card relative to the chassis.

7. A server comprising:

a server card that is removably insertable into a server chassis;

an electronic switching mechanism disposed on the server card and configured to cause three power scares of the server card including a fully-operational state in which a system power of the server card is enabled and a standby power of the server card is enabled;

a standby state in which the system power of the server card is disabled and the standby power of the server card is enabled; and a shutdown state in which the system power of the server card is disabled and the standby power of the server card is disabled; and a locking mechanism disposed on the server card and configured to be in communication with the electronic switching mechanism so that when the electronic switching mechanism causes the server card to be in the fully operational start and the standby state, the electronic locking mechanism is electrically activated to physically prevent removal of the server card from the chassis, and when the electronic switching mechanism causes the server card to be in the fully shutdown state, the locking mechanism is electrically deactivated to permit removal of the server card from the chassis.

8. The server of claim 7 and further comprising:

a management server card removably insertable into the chassis and configured for communication with the server card, and configured to electrically activate the locking mechanism when the server card is in the fully shutdown state to physically lock the server card to the chassis.

9. A server comprising:

a server card that is removably insertable into a server chassis, the server chassis including a system power and a standby power;

an electronic switching mechanism disposed on the server card and electrically coupled to the system power and the standby power of the chassis, the electronic switching mechanism configured to cause three power states of the server card including:

a fully-operational state in which a system power of the server card is enabled and a standby power of the server card is enabled;

a standby state in which the system power of the server card is disabled and the standby power of the server card is enabled; and a shutdown state in which the system power of the server card is disabled and the standby power of the server card is disabled.

10. A method of managing power for a server card, the method comprising:

removably inserting at least one server card within a server chassis;

operating an electronic switching mechanism on the at least one server card to alternately:

activate, via a first state of the electronic switching mechanism, a fully-operational state of the at least one server card, in which a system power of the at least one server is enabled and a standby power of the at least one server card is enabled;

activate, via a second state of the electronic switching mechanism, a standby state of the at least one server card, in which a system power of the at least one server card is disabled and a standby power of the at least one server card is enabled, wherein activating the standby state comprises:

requesting, via a power management module, disabling the system power of the at least one server card in response to a power event of the switching mechanism transitioning from the fully shutdown state to the standby state, thereby triggering a shutdown of an operating system of the at least one server card;

shutting down the system power of the at least one server card after a shutdown of the operating system; and triggering, via a watchdog timer, disabling the system power within a predetermined period of time in the event that the operating system fails to shutdown; and activate, via a third state of the electronic switching mechanism, a fully shutdown state of the at least one server card, in which a system power of the at least one server card is disabled and a standby power of the at least one server card is disabled.

* * * * *

UNITED STATES PATENT AND TRADEMARK OFFICE
CERTIFICATE OF CORRECTION

| | | |
|---|---|---|
| PATENT NO. | : 7,685,443 B2 | Page 1 of 1 |
| APPLICATION NO. | : 10/684768 | |
| DATED | : March 23, 2010 | |
| INVENTOR(S) | : Sachin Navin Chheda et al. | |

It is certified that error appears in the above-identified patent and that said Letters Patent is hereby corrected as shown below:

In column 12, line 17, in Claim 3, delete "start" and insert -- state --, therefor.

In column 12, line 32, in Claim 4, delete "start" and insert -- state --, therefor.

In column 12, line 49, in Claim 4, delete "start" and insert -- state --, therefor.

In column 13, line 60, in Claim 7, delete "scares" and insert -- states --, therefor.

In column 14, line 9, in Claim 7, delete "start" and insert -- state --, therefor.

Signed and Sealed this
Thirtieth Day of August, 2011

David J. Kappos
*Director of the United States Patent and Trademark Office*